Oct. 5, 1948.                 L. H. BROWN                 2,450,712
                   MULTIPLE RETICLE COLLIMATING GUN SIGHT
                            Filed May 5, 1944
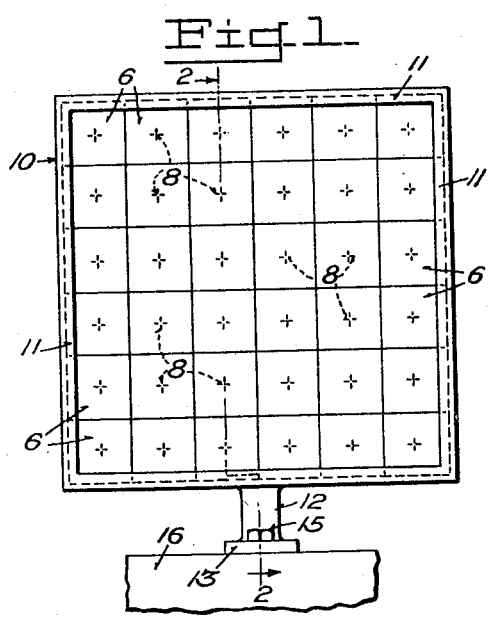
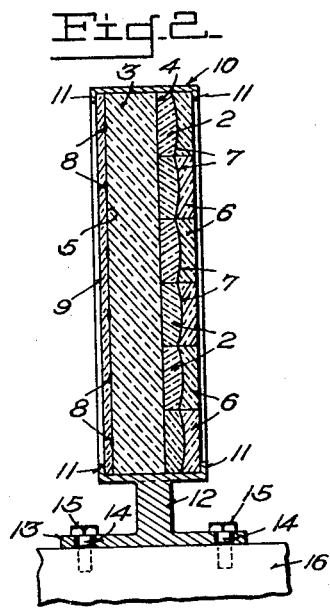
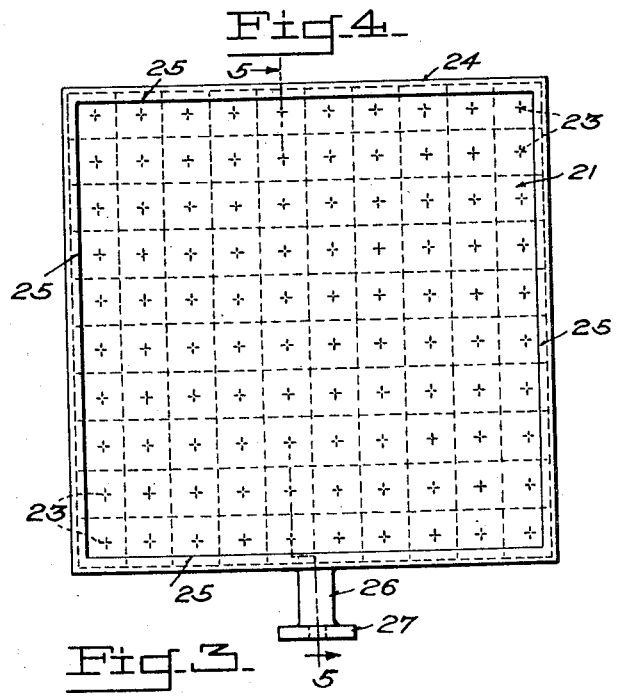
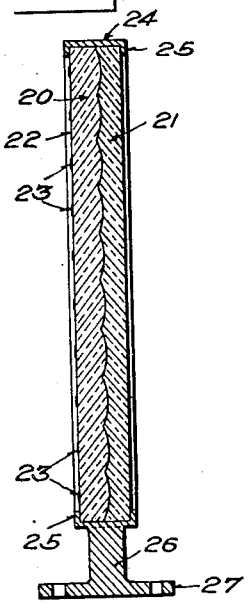
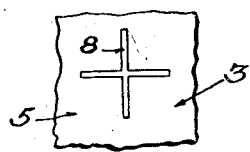
Inventor
Leo H. Brown, Patented Oct. 5, 1948

2,450,712

UNITED STATES PATENT OFFICE 2,450,712

MULTIPLE RETICLE COLLIMATING GUN SIGHT

Leo H. Brown, Glenville, Conn.

Application May 5, 1944, Serial No. 534,285

7 Claims. (Cl. 88—1)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to sights for rifles, cannon, mortars, rocket projectors, and other means for projecting missiles or projectiles, and are generically referred to herein as "gun sights."

A further object of the present invention is the provision of a collimating gun sight which permits considerable movement of the head in all directions in sighting without affecting the accuracy of fire.

Still another object of the invention is the provision of an optical gun sight of the character indicated which permits sighting to be performed by the use of either one or of both eyes simultaneously.

In the drawings which accompany this description of the invention and which form part thereof, Fig. 1 is a front elevation of one modification of the invention;

Fig. 2 is a cross section on the line 2—2 of Fig. 1;

Fig. 3 is an enlarged view of one of the reticles of the gun sight;

Fig. 4 is a front elevation of another gun sight embodying the present invention; and Fig. 5 is a cross section on the line 5—5 of Fig. 4.

Referring to the drawings wherein like characters of reference indicate the same or corresponding parts, the numeral 2 indicates a plurality of plano-convex lenses, which are shown as square in contour, although they may be of some other shape which permits them to be abutted one against the other without intervening space. Another shape meeting these conditions is the shape or contour of a regular hexagon.

Plano-convex lenses 2 are cemented by a suitable transparent cement, for example by means of Canada balsam, upon glass plate 3 which may be square, rectangular or other shape, and advantageously, in horizontal direction, greater in dimension than the average distance between the centers of the human eyes.

In the embodiment of the invention illustrated in Figs. 1 and 2 thirty-six plano-convex lens 2 are cemented to one of the two plane and parallel surfaces 4 and 5 of glass plate 3. Lenses 2 are placed contiguous to each other in horizontal and vertical rows so that no intervening space exists between them.

Thirty-six plano-concave lenses 6 of the same shape and size as plano-convex lenses 2 are provided with the radius of curvature of their concave portion equal to the radius of curvature of the convex portion of plano-convex lenses 2, whereby one plano-concave lens 6 fits or may be fitted above or in front of each plano-convex lens 2 in such a manner that an interface 7 is formed between each pair of the lenses and the contours or shapes of the lenses register. Plano-concave lenses 6 are cemented to plano-convex lenses 2 by a suitable transparent cement such as Canada balsam.

Before lenses 2 and 6 are cemented together as described above, the convex surface or the concave surface of one of them is provided with a mirror or specular surface of silver, aluminum or of other metal or material, and of such thickness or partial transparency that it partly transmits and partly reflects light incident upon it. The thickness of the said mirror or specular material which is applied to the lenses is advantageously such that it reflects fifty per cent of incident light and transmits the fifty per cent constituting the remainder. These mirror surfaces may be applied in well known way by chemical silvering or by evaporation or sputtering processes of producing mirrors.

After the above described mirror or specular coating has been applied to either of lenses 2 or 6, the said lenses are cemented together, one upon the other, as shown in the drawing and as previously described. There is thus formed between each pair of superimposed lenses an interface 7 in which a mirror, which partly reflects and partly transmits light, is positioned and which extends over the entire area of each interface.

The indices of refraction of lenses 2 and 6 are equal or substantially the same, so that no deviation occurs in the path or direction of light passing through the pairs of superimposed lenses 2 and 6.

The curvature of the convex portion of plano-convex lenses 2 and of concave portion of plano-concave lenses 6 is such that the focus of each concave mirror in the interfaces 7 is located at the surface 5 of the glass plate 3. Glass plate 3 may have the same index of refraction as lenses 2 and 6 or a different index of refraction, so long as parallel light rays reflected from the said convex mirror are brought to a focus at the surface 5 of plate 3. Conversely, when the said condition exists, light emitted or reflected from a point in or on said surface and striking said mirror will be reflected therefrom as parallel rays of light.

On the surface 5 of plate 3, in line with the principal axes of each pair of lenses 2 and 6 is placed a reticle 8. There are therefore thirty-six reticles on surface 5 in the embodiment of the invention shown in Figs. 1 and 2. The reticle 8 is shown in the form of a cross in Fig. 3, although it is to be understood that it may be of any desired shape. Reticles 8 consist of silver or other reflecting material and are so applied to surface 5 of plate 3 that the surfaces thereof contiguous to surface 5 are mirrors or mirror surfaces which reflect light towards the concave mirrors in interfaces 7 between the lenses 2 and 6. The reticles 8 are, therefore, in effect mirror reticles or light reflecting reticles.

A glass plate 9 having opposite flat and parallel surfaces, and of the same size and shape as plate 3 is cemented upon the surface 5 of plate 3 after application upon the latter of reticles 8. The cement used for such purpose may be any suitable transparent cement such as Canada balsam.

The composite optical system consisting of lenses 2 and 6, glass plate 3, and glass plate 9, after being cemented together as above described is fitted and secured in a metal frame 10 which passes around and holds the system, and to this end each open face of the frame is provided with flanges 11 for holding the system in said frame. Both faces of the frame are open for the purpose of enabling the target to be seen and sighted by the gunner.

A standard 12, formed integrally with pedestal 13 is attached in any suitable manner midway between the ends of the lower portion of frame 10. Pedestal 13 is provided with suitable holes 14 for bolts 15, whereby the gunsight may be secured on the sight mount 16 of the gun, rifle or artillery piece intended for carrying it.

Lenses 2 and 6 and plates 3 and 9 may be formed from glass or from transparent plastic material.

In the embodiment of the invention illustrated in Figs. 4 and 5, the plano-convex lenses 2 and plate 3 of the embodiment of the invention illustrated in Figs. 1 and 2 are formed as one piece 20; and the plano-concave lenses 6 of the embodiment of the invention illustrated in Figs. 1 and 2 are formed of one piece 21. Mirrors, or specular surfaces, are positioned in the interfaces formed by the convex portions on piece 20 and the concave portions of piece 21. These mirrors partly reflect and partly transmit light as in the embodiment illustrated in Figs. 1 and 2. The focus of each of the mirrors in this embodiment is at the flat surface 22 of the piece 20. Reticles 23 are engraved on the rearward surface 20 opposite each concave mirror at the focus and on the principal axes of each mirror. Adherent light reflecting material, such as a colored paint, is rubbed into the engraved reticle.

In the embodiment of the invention illustrated in Figs. 4 and 5, one hundred concave mirrors are present, and these are arranged in ten vertical and ten horizontal rows.

Pieces 20 and 21 are cemented together with any suitable transparent cement, such as Canada balsam. Pieces 20 and 21 are held in a frame 24, with flanges 25 around both open faces for holding the pieces in position in the frame. A standard 26 is secured to the lower portion of the frame 24 and to the pedestal 27. The pedestal 27 serves the same purposes as pedestal 13 of the modification of the invention illustrated in Figs. 1 and 2.

It is to be noted that in both modifications of the invention illustrated, the principal axes of the concave partly transparent mirrors are parallel, that they have the same focal length; that their poles are substantially in the same plane, and that the reticles are in the focal planes of the mirrors.

For convenience, the relation of the component parts of the sight is recited in the claims with respect to the position of the sight shown in the drawing, that is, for example, with the planes of plates 3 and 9 vertical and with the principal axes of the mirrors horizontal. In this position the mirror surfaces are arranged in horizontal, vertically-superposed rows. It will be understood that this plan is for definiteness and clarity with respect to the horizontal or vertical planes.

I claim:

1. A gun sight comprising means forming a plurality of partially transparent concave mirror surfaces all facing in the same direction, with their principal axes substantially parallel and their principal focal points located in a common plane perpendicular to said axes, said surfaces being arranged side by side in contiguous superposed horizontal rows without interstices therebetween, there being a light reflecting reticle fixed at the focal point of each respective surface, said mirror surfaces, in cooperation with the respective reticles, acting to establish a plurality of reticle images at infinity uniformly distributed over said area, whereby the eye sees an image of a reticle for all positions thereof over said surfaces.

2. In a gun sight, a plurality of pairs of substantially identical optical elements, the elements of each pair comprising a plano-convex lens and a plano concave lens, the curved faces of each said pair of elements interfitting, means forming a partially-reflecting concave surface between said faces, said pairs of elements being arranged in closely-spaced vertically superposed horizontal rows to cover an area, the plane faces of the corresponding elements being coplanar, a transparent plate extending over said area adjacent the plane faces of said plano-convex elements and having its outer face in the common focal plane of said partially-reflecting surfaces, said plate having a plurality of reticles each lying at the focal point of a respective reflecting surface, the principal axes of all said pairs being parallel and substantially normal to said plate.

3. A gun sight comprising a plurality of adjacent partially transparent concave mirrors arranged in horizontal, vertically-superposed rows and having their adjacent edges abutting one another and their principal axes substantially parallel, there being a plurality of said mirrors in each said horizontal row; and a reticle before each said mirror on the principal axis thereof and in the common focal plane of all said mirrors.

4. A gun sight comprising a plurality of adjacent partially transparent concave mirrors arranged in side by side relation in a vertical plane with their adjacent edges abutting, to thereby extend over a substantial area in said plane, there being a plurality of said mirrors extending in both the horizontal and vertical directions in said plane; and a reticle before each said mirror, each said reticle being positioned upon the principal axis of a respective mirror and in the common vertical focal plane of all said mirrors, all said principal axes being horizontal and parallel.

5. A gun sight comprising a plurality of partially transparent concave mirrors arranged in side-by-side, substantially coplanar relation, with their principal axes parallel, to extend over a predetermined area without interstices therebetween, said mirrors being arranged with their focal points in a common plane, a transparent pane having one surface in said common plane, and reticles on said one surface, each said reticle being on the principal axis of a respective mirror, whereby the eyes sees a single image of said reticle at infinity, for all positions of the eye over said area.

6. A gun sight comprising means forming a plurality of optical pairs of elements, each pair comprising a plano-concave lens and a plano-convex lens interfitting and provided with means to form a concave partially-reflecting surface, all said pairs of elements being arranged in contiguous, vertically-superposed horizontal rows to cover an area of predetermined height and width, all said concave reflecting surfaces having their focal points coplanar and their principal axes parallel, there being a reticle at each said focal point, each said pair acting to image its reticle at infinity, whereby the eye sees an image of a reticle for all positions thereof over said area.

7. An aiming sight comprising a first transparent plate having a plurality of concave depressions formed therein in substantially abutting, side-by-side relation to extend, without interstices, over a predetermined area, said area having an extent in mutually perpendicular directions greater than the transverse dimension of one said depression, a second transparent plate having convex protuberances of the same curvature as said concave depressions, each said protuberance being adapted to fit within and form an interface with a respective depression when said plates are in superposed contiguous relation, means forming with each said interface, a concave partially transparent mirror, the focal points of all said mirrors lying in the rearward surface of said second plate.

LEO H. BROWN.

REFERENCES CITED

The following references are of record in the file of this patent:

UNITED STATES PATENTS

| Number | Name | Date |
|---|---|---|
| 683,203 | Grubb | Sept. 24, 1901 |
| 1,678,493 | Albada | July 24, 1928 |
| 1,985,067 | Wandersleb | Dec. 18, 1934 |
| 2,127,925 | Leitz | Aug. 23, 1938 |
| 2,131,039 | Draeger | Sept. 27, 1938 |
| 2,149,171 | Grote | Feb. 28, 1939 |
| 2,151,301 | Percy et al. | Mar. 21, 1939 |
| 2,310,790 | Jurgersen | Feb. 9, 1943 |

FOREIGN PATENTS

| Number | Country | Date |
|---|---|---|
| 269,447 | Germany | Jan. 22, 1914 |
| 437,444 | Great Britain | Oct. 28, 1935 |